April 26, 1966  D. DE GIORGI  3,248,015
VALVE FOR PRESSURIZED LIQUID SPRAYING CONTAINERS
Filed Dec. 2, 1963
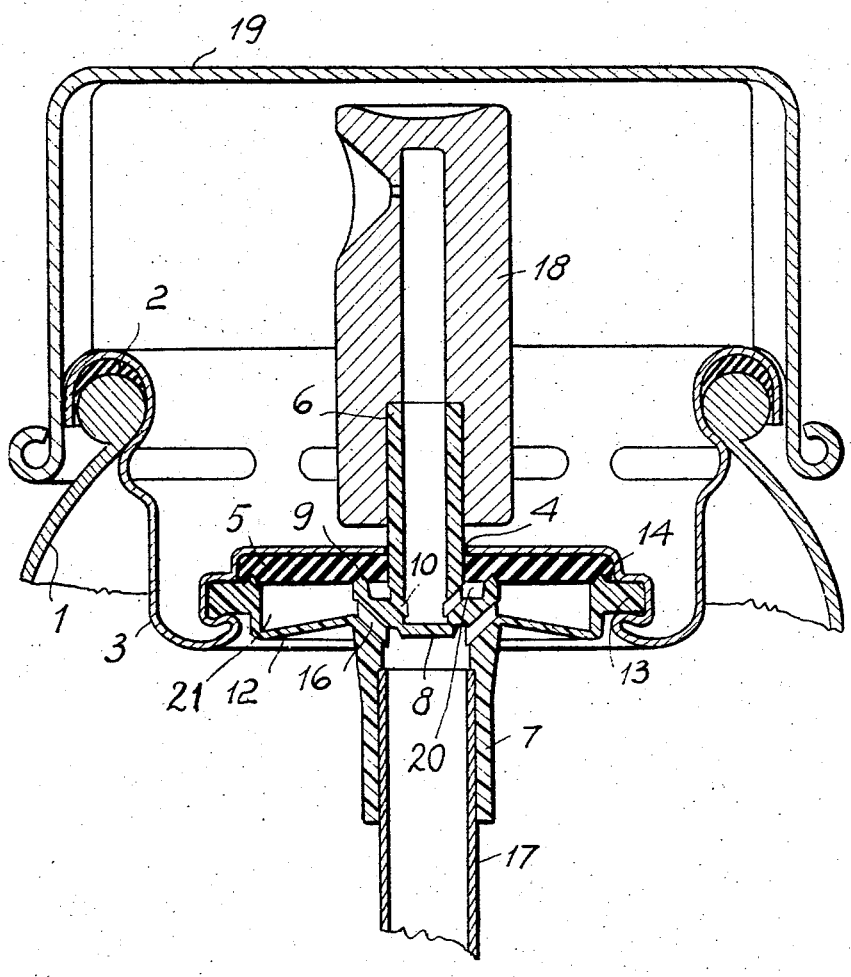
INVENTOR.
Dino De Giorgi
BY
Agent

3,248,015
VALVE FOR PRESSURIZED LIQUID SPRAYING CONTAINERS
Dino De Giorgi, Via Roma 29, Pavia, Italy
Filed Dec. 2, 1963, Ser. No. 327,426
Claims priority, application Italy, Dec. 6, 1962, Patent 679,482
6 Claims. (Cl. 222—182)

This invention relates to valve devices for liquid spraying containers under pressure.

The known valve devices for spraying liquids from containers under pressure, particularly liquids with a low boiling point component, comprise an interceptor member intercepting the exit of the liquid. This member can be pushed in opening position by exerting pressure from the outside against a spring reaction. This interceptor member has to be provided with a seal member maintaining the hermetic closure of the container even when the interceptor member is displaced with respect to the fixed parts of the valve assembly for opening and closing the discharge channel.

Providing a spring, which is generally a spiral spring in the valve devices of such kind always represents a problem inasmuch as the spring has to be housed in a suitable case, has to rest upon a counter surface, and can be damaged by the contact with the sprayed liquid and in turn damage the liquid. It also involves a cost which appreciably weighs on the valve assembly, which cost is not only constituted by the intrinsic value of the spring in itself, but also by the accessory structures involved and the consequent mounting operation which thus becomes necessary.

It is an object of this invention to provide a valve device for the above-specified use in which the structure of the interceptor or valve member is such as to provide for the elastic reaction as necessary for the closing without requiring other members acting thereon to take a determined rest position, thus reducing the valve assembly to a very few components with limited overall dimensions and possibility to attend to the mounting operations quite simply and quickly, involving consequently a small cost.

The valve device according to this invention comprises to this end a body which can be fastened to the container mouth and is provided with a hole which can be closed by a movable interceptor or valve member with the interposition of a suitable yielding gasket and having the characteristic that said interceptor member is provided with an elastic flange the peripheral edge of which is fastened to the valve body.

Since the valve devices in question are generally designed to deliver a liquid collected from the bottom of the container, fast with said interceptor member there is provided an intake pipe leading to the space between the interceptor member itself and the aforesaid elastic flange thereof which is tightly fastened to the valve body, so that the liquid can pass through the interceptor member, when this opens, only when coming from the bottom of the container whereat the intake pipe extends.

For normal uses, the interceptor member is generally provided with a small boss part designed to carry the spray nozzle, said bush going through the aforementioned hole in the valve body and being in communication with the space which is located above the closure provided by the interceptor member.

The aforesaid characteristics of the valve device according to this invention will become more apparent from the following description of a preferred but non-limiting embodiment represented in the accompanying drawing, in which the only figure is an axial section thereof.

In the figure there is only represented the upper part of the container 1, on which by the interposition of an annular gasket 2 the cover member 3 is fitted. The diaphragm-like cover member has a cup-like configuration as shown, the bottom of which is bored in 4 and is provided on the lower face with a coating of yieldable material 5 acting as a seal gasket and providing a valve seat for the movable interceptor member. The moving member of the valve device is formed of a piece comprising two coaxial tubular parts 6 and 7, which are separated by a cross-septum 8; the part 7 has a somewhat larger diameter than the part 6 and extends upwardly beyond the septum 8 with an edge 9, adapted to build a tight seal against the gasket 5 at a certain distance from the outer surface of the part 6. The ducts 10 put the annular chamber 20 delimited by the part 6, the edge 9 and the gasket 5 into communication with the inside of the part 6. Approximately at the height of the edge 8, the part 7 is provided with a flange 12, radially extending outwardly with a slightly upwardly converging frusto-conical shape and which is peripherally fastened in 13 by elastical folded seams or other means to the cover member 3. Flange 12 has an annular ridge 14 building a seal together with the adjacent surfaces thereof against the aforesaid gasket 5. One or more ducts 16 put the inside of the part 7 into communication with the annular chamber 21 delimited by the flange 12 and gasket 5.

The aforesaid part 7 extends, with a tube 17 fitted therein, toward the bottom of the container, whilst the part 6 with its end, extending from the hole 4 and building a seal against the gasket 5, carries a nozzle 18, which can be protected by a cover 19 fitted to the mouth of the container 1.

The conical flange 12 consists of the same synthetic plastic materials forming the parts 6 and 7 having appropriated elastic characteristics and a sufficient rigidity to exert a reaction on the portion 6–7 such as to provide a seal of the edge 9 against the gasket 5 by taking into account that to this elastic sealing force there is also to be added the pressure existing in the container and acting on the area surrounded by the edge 9, when the nozzle with pushbutton 18 is not pressed down to actuate the liquid supply.

The operation is as follows:

Normally the elastic force of flange 12 presses the edge 9 against gasket 5 and prevents communication between spaces 20 and 21. Thus the fluid under pressure cannot escape through nozzle 18. This closing action is increased by the fluid pressure acting from the interior of the container against flange 12.

To spray the liquid after having removed the cover 19, nozzle 18 is downwardly pressed so that flange 12 elastically bends and edge 9 is separated from gasket 5. In this way a communication is obtained between annular chambers 20 and 21 and the liquid under pressure may rush through ducts 10 in the nozzle 18 and be sprayed therethrough.

As it can be seen, an important characteristic of this valve device is that same is made up of very few component parts, that is the cover member 3 and moving piece 6–7–12 with the gasket 5; so that the mounting of these parts on the container is quite simple and quick; furthermore, as mentioned, there is no metal spring provided.

I claim:

1. A valve device for pressurized fluid spraying containers with an opening on one end thereof, comprising a cover member fixed on said container and covering said opening, a hole in said cover member, a valve body slidably fitting within said hole, flange portion radially extending from said valve body and arranged below said cover member, said flange portion having a first annular rim surrounding said hole and spaced from said valve body and secured to said cover member, a sealing means with a hole equal to, and registering with the hole in the cover member and surrounding said valve body, fitted under the cover member and extending over said first annular rim, said flange portion, said rim, said valve body and said cover member defining a first annular chamber surrounding said hole, an upper tubular portion of said valve body projecting upwardly of said cover member with at least a portion thereof, a lower tubular portion of said valve body projecting downwardly of said cover member with at least a portion thereof, an intermediate wall in said valve body separating the cavity of said first tubular portion from the cavity of said second tubular portion, a second annular rim on said valve body surrounding said hole at a distance therefrom and having a diameter smaller than the diameter of said first annular rim, said second annular rim, said cover member and said body defining a second annular chamber surrounding said hole and having a smaller diameter than said first annular chamber, said first and said second annular chambers being separated from each other by said second annular rim in cooperation with said cover member when said body is in an upper position thereof and said first and said second annular chambers communicating with each other when said body is in a lower position thereof, said flange portion being at least partly made of resilient material normally urging said body in the upper position thereof, first duct means connecting the cavity of said lower tubular portion with said first annular chamber, second duct means connecting the cavity of said upper tubular portion with said second annular chamber, and sealing means for said first and said second annular chambers.

2. A valve device according to claim 1, further comprising a nozzle member fitted on said upper tubular portion.

3. A valve device according to claim 2, wherein said nozzle member has a pushbutton portion.

4. A valve device according to claim 1, further comprising a cap on said container and covering said valve device.

5. A valve device according to claim 1, wherein said second rim is in the form of an acute ridge and said sealing means is secured on said cover member and faces said second rim, said ridge of said second rim penetrating in said sealing means when said valve body is in the upper position thereof.

6. A valve device according to claim 1, wherein said valve body, said upper and said lower tubular portions, said flange portion and said first and said second rims are altogether made of a single piece of plastic material.

References Cited by the Examiner

UNITED STATES PATENTS

| | | |
|---|---|---|
| 2,912,173 | 11/1953 | Edwards. |
| 2,951,645 | 9/1960 | Price et al. _____ 239—337 X |
| 3,096,003 | 7/1963 | Nesin _____ 239—579 X |
| 3,117,700 | 1/1964 | Gorman. |

RAPHAEL M. LUPO, *Primary Examiner.*